Aug. 14, 1923.
W. H. ZACHRY
1,464,896
DETACHABLE HANDLE FOR BROOMS
Filed May 5, 1922
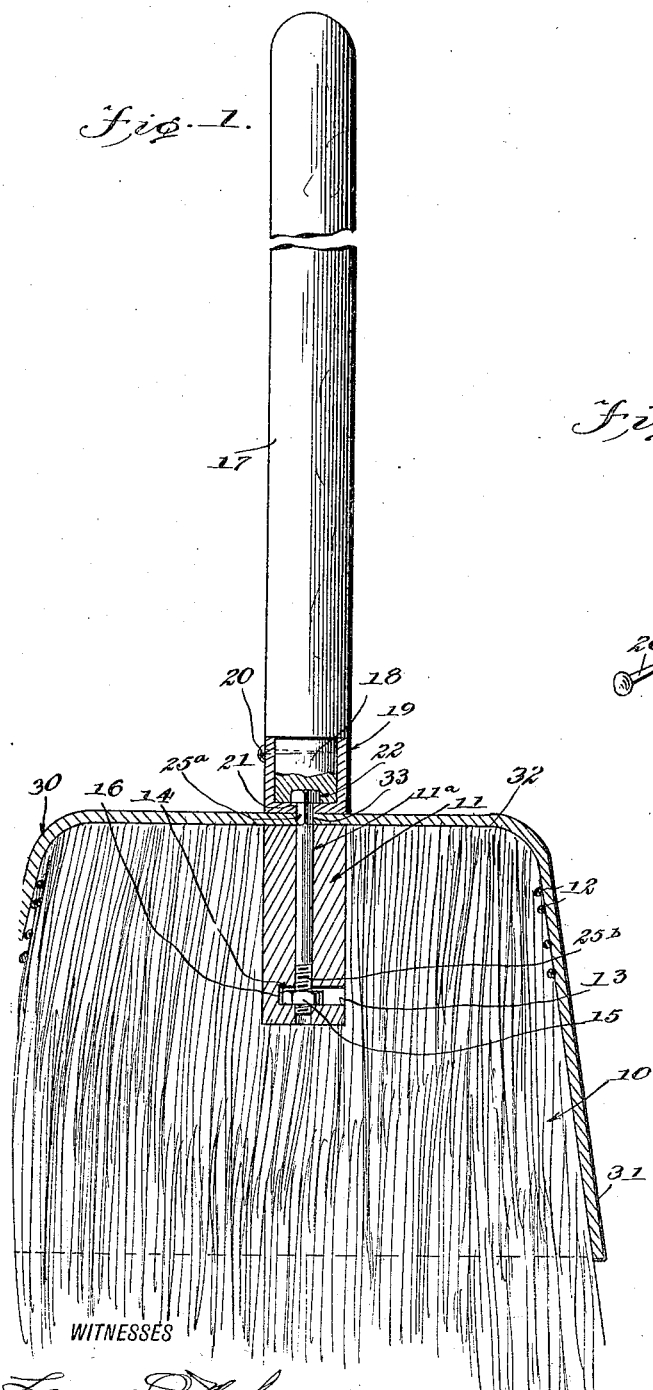
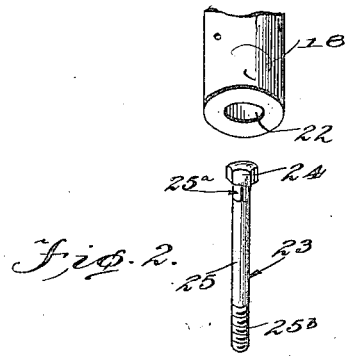
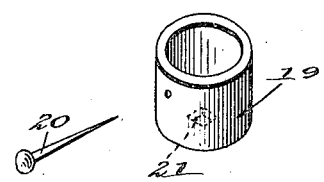
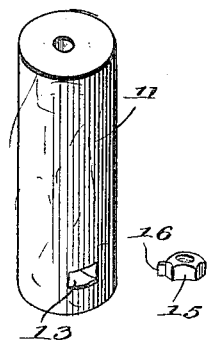
INVENTOR
W. H. Zachry,
BY
ATTORNEYS Patented Aug. 14, 1923.

1,464,896

UNITED STATES PATENT OFFICE.

WALTER HARVEY ZACHRY, OF ATLANTA, GEORGIA.

DETACHABLE HANDLE FOR BROOMS.

Application filed May 5, 1922. Serial No. 558,636.

*To all whom it may concern:*

Be it known that I, WALTER H. ZACHRY, a citizen of the United States, and a resident of Atlanta, in the county of Fulton and State of Georgia, have made certain new and useful Improvements in Detachable Handles for Brooms, of which the following is a specification.

This invention relates to an improvement in brooms having detachable handles and has for its object to provide a broom of this character having a detachable handle adapted to be positively and rigidly associated with the improved broom structure and which is of simple and durable construction, reliable in operation and easy and comparatively inexpensive to manufacture.

Other objects and advantages reside in certain novel features of construction, arrangement and combination of parts which will be hereinafter more fully described and particularly pointed out in the appended claims, reference being had to the accompanying drawing forming a part of this specification and in which:—

Figure 1 is a view partly in section and partly in elevation showing the preferred embodiment of the invention.

Figure 2 is a group view in perspective of the attaching means, showing the parts immediately prior to assembly.

Referring to the drawing, the numeral 10 designates a broom in the head of which a block 11 is adapted to be embedded, the block being held in the head of the broom by the binding wires 12. The block 11 is slotted laterally or radially as at 13 and in the inner end of the slot a recess or notch 14 is formed. A nut 15 is inserted in the slot 13 and is provided with a lug 16, which seats in the recess 14 to prevent the nut 15 from turning.

The handle of the broom is designated at 17 and the lower end of the handle is reduced, as at 18 and is adapted to receive a ferrule or cap 19, the ferrule or cap being held on the reduced end of the handle 17 in assembly by means of a pin or similar fastening means 20. The end or head of the cap or ferrule 19 is provided with a squared opening 21, which is alined with an axial opening 22 formed in the end of the handle, when the ferrule is positioned on the handle.

An attaching bolt 23 is provided and includes a head 24 adapted to be received in an opening or socket 22 in the handle 17, and a shank 25 adapted to extend through the bore 11ª of the block 11, the shank having a squared portion 25ª cooperable with the squared opening 21 of the ferrule to prevent the bolt from turning relative to the ferrule. The shank of the bolt also includes a threaded portion 25ᵇ which is engageable with the nut 15.

In assembling the handle with the broom, the nut 15 is first inserted in the slot 13 of the block 11 and the block 11 is then embedded and secured in the head of the broom. The bolt 23 is then placed in position in the ferrule with its squared portion 25ª of its shank engaging the squared opening 21 of the ferrule. The shank of the bolt 23 may then be introduced into the bore of the block 11 and turned so as to enter into threaded engagement with the nut 15, the nut 15 being prevented from turning by the action of its lug 16 and the recess 14. Obviously the handle 17 may be secured to the ferrule either prior or subsequent to the assembly of the bolt 23 with the block and nut. The handle of said broom may be conveniently and readily replaced and renewed or may be detached from the broom whenever desired.

A shield 30 may be provided and is adapted to be held in place by the means employed to detachably connect the handle to the broom. This shield preferably includes a body portion 31 and a head 32 integral with the body portion and having an opening 33 to admit of the passage of the bolt 23, the head 30 being interposed between the ferrule 19 and the block 11, whereby the shield is held in position.

It is to be understood that if desired the attaching bolt 23 may be formed integral with the ferrule or cap 19.

I claim:

1. In a detachable handle for brooms, a block secured in the head of the broom, said block being provided with a bore extending lengthwise thereof, with a slot extending transversely of the block and in communication with the bore and with a recess at the inner end of the slot, a nut arranged in the slot of the block with the threaded opening thereof in alinement with the bore, a ferrule connected with the handle and a bolt carried by the ferrule and adapted to be inserted in the bore of the block and engaged with the nut.

2. In combination, a broom having a head, a block embodied in the head, binding wires for securing the block and the head, a shield for the broom head, a handle, a ferrule connected with the handle and engageable with the shield, said shield having an opening, said block being provided with a bore extending lengthwise thereof and with a slot extending transversely of the block and in communication with said bore, a nut arranged in the slot with the threaded opening thereof in alinement with the bore, means for preventing the nut from turning in the slot, a bolt carried by the ferrule and adapted to be extended through the bore and engaged with the nut whereby the handle is secured to the broom, and the shield is held in position.

3. In combination, a broom having a head, a block embodied in the head, binding wires for securing the block in the head, a removable shield for the broom head, a handle, said shield having an opening, said block having a lengthwise opening therein and having a nut embedded therein with the threaded opening thereof alined with the opening of the block, a bolt carried by the handle and adapted to be extended through the opening of the shield and of the block and engaged with the nut whereby the handle is secured to the broom and the shield is held in position thereon.

WALTER HARVEY ZACHRY.